United States Patent
Baba et al.

(10) Patent No.: US 9,106,406 B2
(45) Date of Patent: Aug. 11, 2015

(54) COMMUNICATION APPARATUS AND KEY MANAGING METHOD

(75) Inventors: Shinichi Baba, Bristol (GB);
Yoshimichi Tanizawa, Kanagawa (JP);
Hideaki Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/596,279

(22) Filed: Aug. 28, 2012

(65) Prior Publication Data

US 2013/0259233 A1    Oct. 3, 2013

(30) Foreign Application Priority Data

Mar. 28, 2012    (JP) .................. 2012-074276

(51) Int. Cl.
*H04L 9/08* (2006.01)

(52) U.S. Cl.
CPC ............... *H04L 9/08* (2013.01); *H04L 9/0852* (2013.01); *H04L 9/0861* (2013.01); *H04L 9/0894* (2013.01)

(58) Field of Classification Search
CPC .................................................. H04L 9/0894
USPC .......................................................... 380/277
See application file for complete search history.

(56) References Cited

U.S. PATENT DOCUMENTS

| 4,918,728 A * | 4/1990 | Matyas et al. ............ 380/280 |
| 2010/0161751 A1* | 6/2010 | Stewart ................... 709/213 |

FOREIGN PATENT DOCUMENTS

| JP | 2007-122391 | 5/2007 |
| JP | 2005-509305 | 4/2008 |
| JP | 2008-154019 | 7/2008 |
| JP | 2008-234217 | 10/2008 |
| WO | WO 2011/119300 A2 | 9/2011 |

OTHER PUBLICATIONS

Oliver Maurhart, "Chapter 8: QKD Networks Based on Q3P", Applied Quantum Cryptography, Lect. Notes Phys., vol. 797, 2010, pp. 151-171.

Mehrdad Dianati et al., "Architecture and protocols of the future European quantum key distribution network", Security and Communication Networks, vol. 1, 2008, pp. 57-74.

U.S. Appl. No. 13/788,078, filed Mar. 7, 2013, Baba, et al.

Office Action mailed Apr. 30, 2014 in Japanese Application No. 2012-074276 filed Mar. 28, 2012 (w/English translation).

(Continued)

*Primary Examiner* — Jacob Lipman
(74) *Attorney, Agent, or Firm* — Oblon, McClelland, Maier & Neustadt, L.L.P.

(57) ABSTRACT

According to an embodiment, a communication apparatus includes a key storage unit configured to store therein a cryptographic key; a receiving unit configured to receive a message; an analyzing unit configured to analyze whether the message includes an access request for the cryptographic key; a generating unit configured to, when the message includes the access request, generate request information used to request an access to the cryptographic key requested by the access request; and an access controller configured to control the access to the cryptographic key based on the request information.

7 Claims, 12 Drawing Sheets

(56) References Cited

OTHER PUBLICATIONS

Ikki Moriyama et al., "Static Analysis for Mandatory Access Control by Collaboration of Compiler and OS", Computer Security Symposium 2007 Proceedings (CSS2007), Japan, Information Processing Society, Oct. 31, 2007. vol. 2007, No. 10, pp. 103-108.

Office Action mailed Sep. 24, 2014 in Japanese Application No. 2012-074276 filed Mar. 28, 2012 (w/English translation).

* cited by examiner

| KEY ID | KEY VIRTUAL CLASS | UPPER CLASS ID | KEY INFORMATION |
|---|---|---|---|
| 0001 | LINK | (NONE) | |
| 0002 | APPLICATION | 0001 | |
| 0003 | APPLICATION | 0001 | |
| 0004 | APPLICATION | 0005 | |
| 0005 | LINK | (NONE) | |

COMMUNICATION APPARATUS AND KEY MANAGING METHOD

CROSS-REFERENCE TO RELATED APPLICATIONS

This application is based upon and claims the benefit of priority from Japanese Patent Application No. 2012-074276, filed on Mar. 28, 2012; the entire contents of which are incorporated herein by reference.

FIELD

Embodiments described herein relate generally to a communication apparatus and a key managing method.

BACKGROUND

There is a known study project on quantum cryptographic communication, called SECOQC (secure communication based on quantum cryptography). The SECOQC proposes technologies of functions used to exchange keys based on random numbers generated through QKD (quantum key distribution) and then distributed and accumulated in a plurality of nodes, a protocol called Q3P (quantum point to point protocol), and the like.

The QKD is a method of realizing an enhancement in security of the next generation communication, and the security of a service thereof is important. For example, the QKD is a revolutionary technology capable of providing an absolute secure communication environment.

In the related art, however, if the security of a cryptographic key generated in a system using the QKD is not ensured, the absolute security of communication using the QKD may not be realized. In particular, a cryptographic key preserved inside may leak due to attacks from a network, such as attacks to a communication node and a service provided with the cryptographic key from a route through which the cryptographic key is distributed. That is, a countermeasure against so-called cyber-attacks is a task.

DETAILED DESCRIPTION

According to an embodiment, a communication apparatus includes a key storage unit configured to store therein a cryptographic key; a receiving unit configured to receive a message; an analyzing unit configured to analyze whether the message includes an access request for the cryptographic key; a generating unit configured to, when the message includes the access request, generate request information used to request an access to the cryptographic key requested by the access request; and an access controller configured to control the access to the cryptographic key based on the request information.

Various embodiments will be described in detail with reference to the accompanying drawings.

First Embodiment

A communication apparatus (node) according to a first embodiment is configured not to gain direct access to a cryptographic key from an external network.

Figure 1:
FIG. 1 is a diagram illustrating an example of a network configuration of a cryptographic communication system.

FIG. 1 is a diagram illustrating an example of a network configuration of a cryptographic communication system. Cryptographic communication using cryptography (application key use) is performed between a plurality of applications (applications 200a and 200c) to ensure communication security.

A cryptographic scheme used for the cryptographic communication and a scheme for generating a key used for encryption are gradually advanced with development of technologies. For example, the QKD has become popular as a unit for providing absolutely secure communication. The QKD can be used as a function (service) of providing a cryptographic key for the cryptographic communication. Such a service (cryptographic key generating service) is configured to be independent from cryptographic data communication. With such a configuration, enhanced cryptographic communication can be provided.

Figure 2:
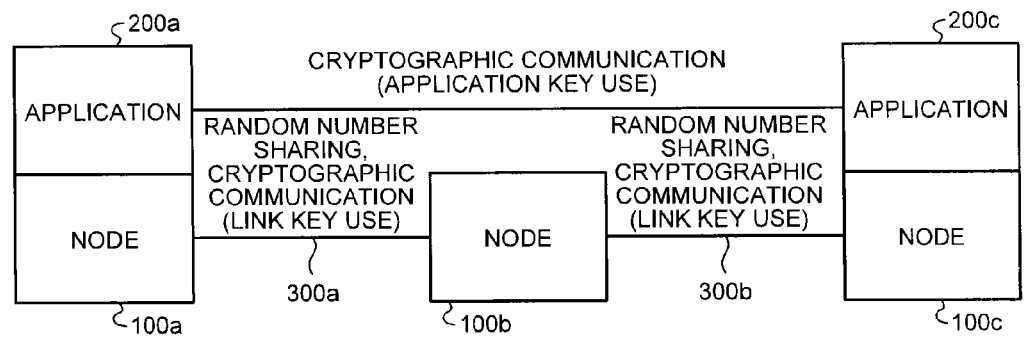
FIG. 2 is a diagram illustrating a network configuration of a cryptographic communication system according to a first embodiment.

FIG. 2 is a diagram illustrating an example of a network configuration of a cryptographic communication system according to a first embodiment. FIG. 2 illustrates the example of the network configuration of the communication system that provides a cryptographic key generating service independently from cryptographic data communication.

As illustrated in FIG. 2, the cryptographic communication system according to the embodiment includes nodes 100a to 100c as communication apparatuses and the applications 200a and 200c.

When it is not necessary to distinguish the nodes 100a to 100c from each other, the nodes 100a and 100c are simply referred to as the nodes 100. When it is not necessary to distinguish the applications 200a and 200c from each other, the applications 200a and 200c are simply referred to as the applications 200. The number of nodes 100 is not limited to three. Further, the number of applications 200 is not limited to two. The application 200 may be realized integrally with the node 100 or may be realized as a terminal independent from the node.

The nodes 100a to 100c each have a function of generating a random number and sharing the random number with a partner node and a function of performing cryptographic communication on a link using the generated random number as a link key.

The node 100 may have a function of generating a random number independently from a link and a function of transmitting the generated random number to another node. Hereinafter, a case in which the nodes 100a and 100c (which are nodes connected to the applications 200a and 200c, respectively) have these functions will be described. Specifically, an example of the network configuration illustrated in FIG. 2 will be described.

In this network, the nodes 100a and 100b are connected to each other via a link 300a which is a cryptographic communication network, and the nodes 100b and 100c are connected to each other via a link 300b which is a cryptographic communication network.

The application 200a performs cryptographic communication with the application 200c.

The application 200a acquires an application key from the node 100a to perform the cryptographic communication.

The application 200c acquires the application key from the node 100c to perform the cryptographic communication.

In this cryptographic communication system, a cryptographic key provided by the cryptographic key generating service is exposed to various risks. For example, examples of the risk include wiretapping of a communication path, unrighteous access to a node 100, and inappropriate activation of an application 200. The QKD reliably detects and disables the wiretapping of a communication path, but may not prevent an unrighteous access to the node 100. Accordingly, in some cases, the advantage of the QKD ensuring absolute security may not be sufficiently obtained at a system level.

Accordingly, in this embodiment, the cryptographic key generating service is configured to ensure the security of the generated cryptographic key, even when cryptographic communication system is connected to a network to communicate with an existing communication system.

Figure 3:
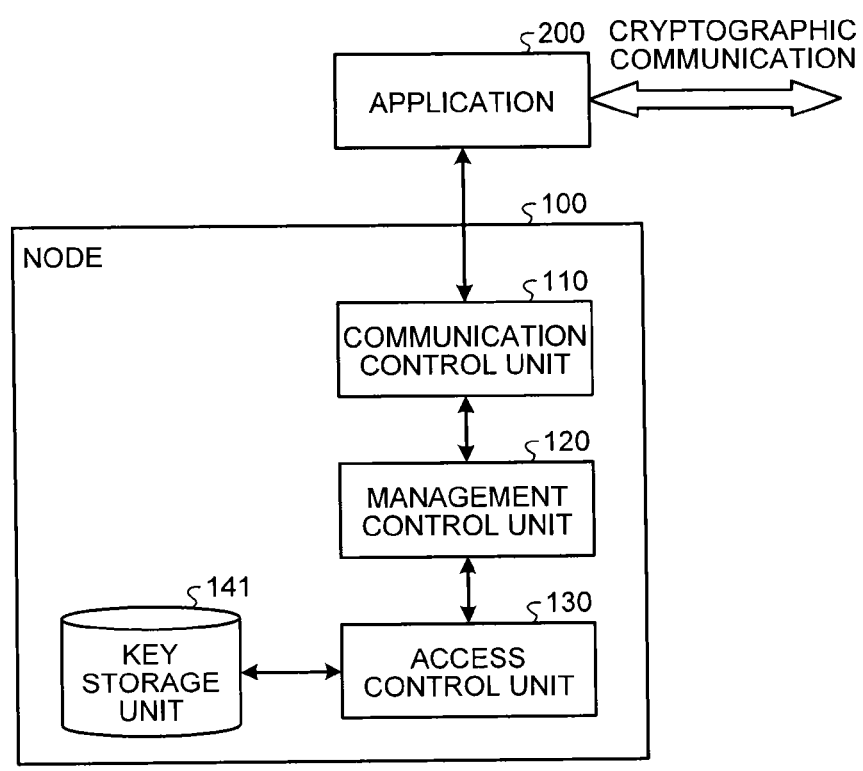
FIG. 3 is a block diagram illustrating the configuration of a node according to the first embodiment.

FIG. 3 is a block diagram illustrating an example of the configuration of the node 100. As illustrated in FIG. 3, the node 100 includes a communication control unit 110, a management control unit 120, an access control unit 130, and a key storage unit 141.

The key storage unit 141 stores therein a cryptographic key. The cryptographic key may be any cryptographic key including, for example, the link key and the application key illustrated in FIG. 2. The key storage unit 141 can be configured by any generally-used storage medium such as an HDD (hard disk drive), an optical disc, a memory card, or a RAM (random access memory).

The communication control unit 110 controls the communication between the node 100 and an external apparatus such as the application 200. For example, the communication control unit 110 receives a message for requesting an access to a cryptographic key from the application 200. The communication control unit 110 transmits the cryptographic key read from the key storage unit 141 to the application 200 in response to the message. The function and the configuration of the communication control unit 110 will be described in detail later.

The management control unit 120 controls management of the cryptographic key in response to the access request transmitted from the communication control unit 110. The management control unit 120 performs the management of the cryptographic key such as determination of conditions of the cryptographic communication with the application 200 and determination of necessary specifications of the cryptographic key. The management control unit 120 transmits an access request to the access control unit 130, when the management control unit 120 attempts an access to the cryptographic key stored in the key storage unit 141.

Thus, the management control unit 120 integrates the functions of the access to the key storage unit 141 to the access control unit 130. Accordingly, for example, the access control unit 130 can simply detect an abnormal access.

The access control unit 130 controls the access to the cryptographic key stored in the key storage unit 141 in response to the access request received via the management control unit 120.

When the cryptographic key is managed, a database (key database) may be used to perform the management easily and efficiently. The key database can be designed to be distributed and managed to gain access only from the access control unit 130 so that the cryptographic key leaking in the access from functions other than the access control unit 130 becomes difficult. The distributed management of the cryptographic key has an advantage of protecting the cryptographic key against from direct access attacks to the key storage unit 141 when the node 100 is turned off. The same advantage can be obtained by encrypting the preservation of the cryptographic key in the key storage unit 141.

The communication control unit 110, the management control unit 120, and the access control unit 130 may be realized by executing a program on a processing device such as a CPU (central processing unit), that is, by executing software, may be realized by hardware such as an IC (integrated circuit), or may be realized by a combination of software and hardware. The node 100 may be configured to include a security chip and confirm legitimacy of the software and hardware through trust chain from the security chip.

Figure 4:
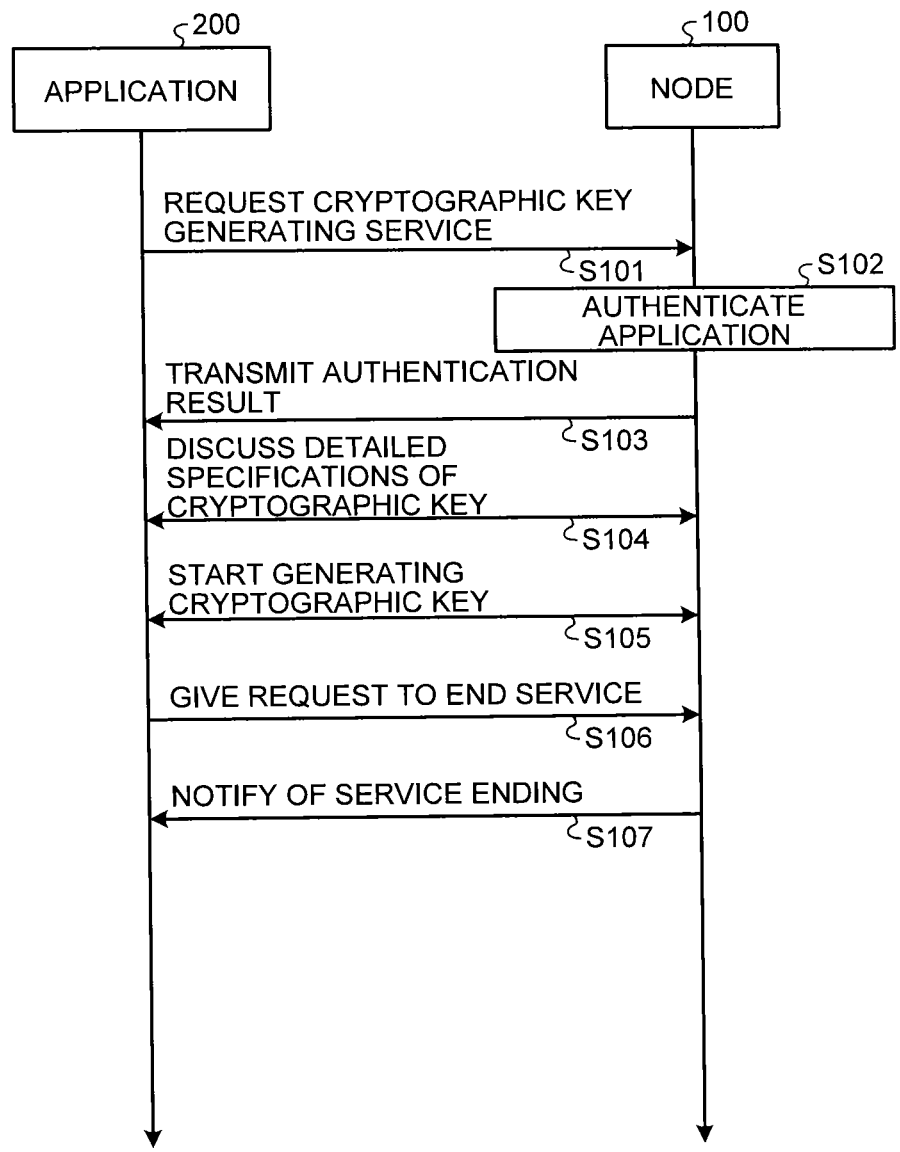
FIG. 4 is a diagram illustrating the sequence of a service usage process according to the first embodiment.

Next, a service usage process performed in the cryptographic communication system having the above-described configuration according to the first embodiment will be described with reference to FIG. 4. FIG. 4 is a diagram illustrating an example of the sequence of the service usage process according to the first embodiment.

First, the application 200 accesses the communication control unit 110 via the network and transmits a request for the cryptographic key generating service (step S101). The node 100 authenticates the validity of the application 200 which is a request source (step S102). The node 100 transmits the authentication result to the application 200 (step S103). When the validity is authenticated, the application 200 and the node 100 discuss the necessary detailed specifications of the cryptographic key (step S104) and start generating and providing the cryptographic key (step S105).

When the cryptographic communication ends in the application 200, the application 200 gives a request to end the cryptographic key generating service (step S106). The node 100 ends the cryptographic key generating service in response to this request and notifies the application 200 that the node 100 ends the cryptographic key generating service (step S107).

Thus, the abundant information regarding the cryptographic key generating service is transmitted and received between the application 200 and the communication control unit 110. A part of the transmitted and received information is also delivered to the management control unit 120 and the access control unit 130 to provide the cryptographic key in response to the request from the application 200. Further, the provided cryptographic key is read from the key storage unit 141 by the access control unit 130, and then is delivered and provided to the application 200 via the management control unit 120 and the communication control unit 110.

Thus, the information is transmitted and received to and from the inside and the outside of the node 100. Accordingly, an outside wiretapper attempts to wiretap or leak the internal cryptographic key of the node 100 from the outside through the route or pass along which the information is transmitted and received.

Accordingly, in this embodiment, to prevent such attacks or invasions, the communication control unit 110 is designed to analyze the contents of a message from the application 200.

Figure 5:
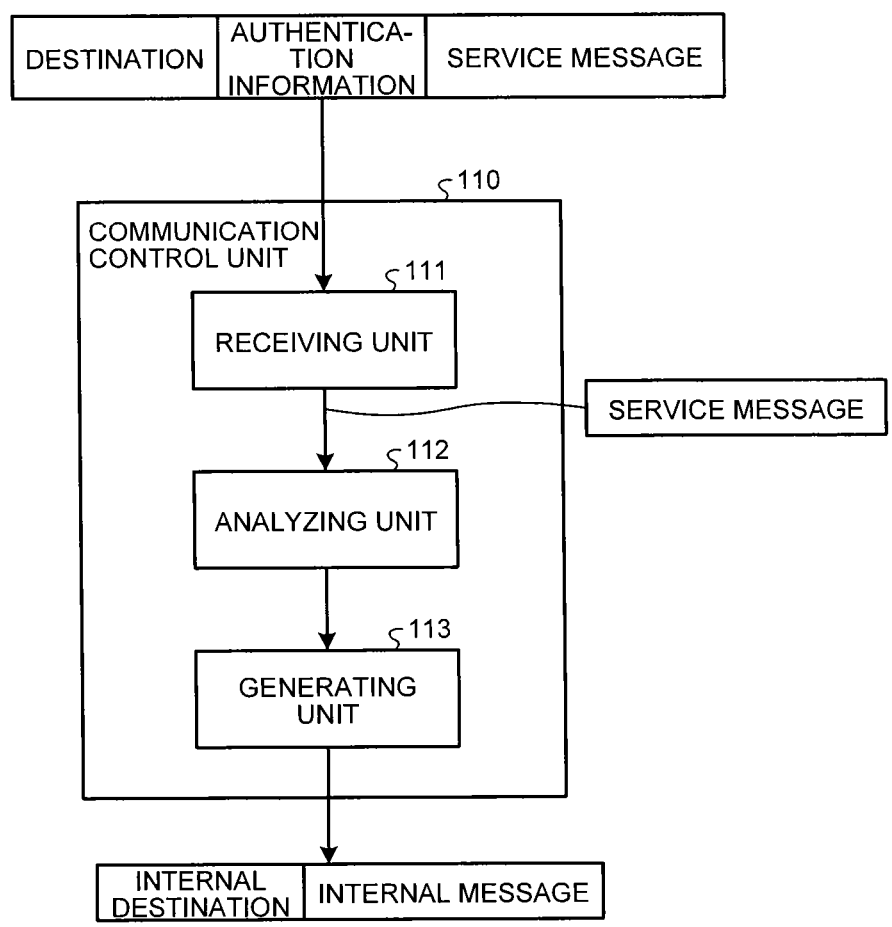
FIG. 5 is a block diagram illustrating a communication control unit according to the first embodiment.

FIG. 5 is a block diagram illustrating an example of the detailed functional configuration of the communication control unit 110. As illustrated in FIG. 5, the communication control unit 110 includes a receiving unit 111, an analyzing unit 112, and a generating unit 113.

The receiving unit 111 receives various kinds of information via a communication I/F (interface) (not illustrated in FIG. 5) connected to the application 200 or the like. For example, the receiving unit 111 receives the message for requesting the access to the cryptographic key from the application 200.

FIG. 5 illustrates an example of the data structure of the message. In this example, the message includes a destination, authentication information, and a service message. For example, the destination is identification information such as an IP address or a port number used to designate use of the function of the management control unit 120. For example, the authentication information is used to verify whether the received message is valid. For example, the service message is the entity of the message including the contents of the service requested by a transmitting source. The data structure of this message is not limited thereto.

The receiving unit 111 transmits the service message extracted from the received message to the analyzing unit 112.

The analyzing unit 112 analyzes the syntax of the received message (the service message) to analyze whether the received message includes the access request for the cryptographic key stored in the key storage unit 141. For example, the analyzing unit 112 analyzes the service message in accordance with a predetermined syntax rule and extracts the access request described in a format conforming to the syntax rule. Any syntax rule may be used. For example, a rule agreed in advance with a legitimate transmitting partner (the application 200 or the like) can be used as the syntax rule.

When the received message includes the access request, the generating unit 113 generates request information used to request an access to the cryptographic key requested to be accessed. The request information is information used inside the node 100. As illustrated in FIG. 5, for example, the request information includes an internal destination and an internal message. The internal destination is a destination that is used inside the node 100. The internal message is a message that includes the access request analyzed by the analyzing unit 112.

The internal message has any format. For example, when the internal message has a format different from a service message received from the outside, an unrighteous access to the cryptographic key from the outside can be reduced. When it is confirmed that the service message has the syntax or contents regulated in advance, the internal message may not be newly constructed, but a necessary portion of the message received from the application 200 may be embedded into a part of the internal message and may be delivered to the management control unit 120.

The generating unit 113 delivers the generated request information (internal message) to the management control unit 120.

By providing the analyzing unit 112 and the generating unit 113, a message from the outside or a code included in a message can be configured not to be executed in the units included in the communication control unit 110 of the system.

In the above-described configuration, whenever the functions of the management control unit 120, the access control unit 130, and the like are updated, the communication control unit 110 is also required to be updated in order to transmit and receive the internal message according to the update. On the other hand, when the communication control unit 110 is updated, it may not be necessary to update the application 200. That is, the load such as modification of the application 200 due to the update of the internal function of the node 100 can be reduced.

Figure 6:
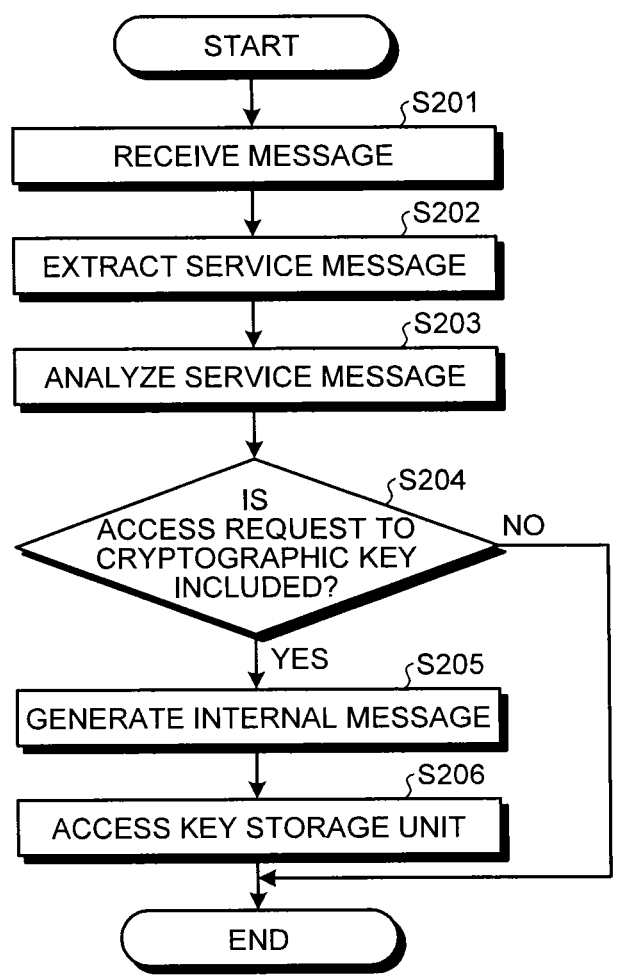
FIG. 6 is a flowchart illustrating a key accessing process according to the first embodiment.

Next, a key accessing process performed in the node 100 having the above-described configuration according to the first embodiment will be described with reference to FIG. 6. FIG. 6 is a flowchart illustrating an example of the key accessing process according to the first embodiment.

First, the receiving unit 111 receives a message transmitted by the application 200 or the like via the communication interface (step S201). The receiving unit 111 extracts the service message from the received message (step S202). The receiving unit 111 may be configured to authenticate the message using the authentication information included in the received message.

The analyzing unit 112 analyzes the syntax of the service message (step S203). The analyzing unit 112 determines whether the service message includes the access request for the cryptographic key (step S204). When the service message includes the access request (Yes in step S204), the generating unit 113 generates request information (internal message) used to request an access to the cryptographic key requested to be accessed (step S205). The generating unit 113 transmits the generated request information to the management control unit 120. The management control unit 120 also transmits the request information to the access control unit 130 since the request information indicates the key accessing process. The access control unit 130 accesses the cryptographic key stored in the key storage unit 141 in accordance with the request information (step S206).

When the service message does not include the access request (No in step S204), the key accessing process ends.

Thus, the access to the key storage unit 141 is not allowed except that it is analyzed that the righteous access request is given in accordance with the syntax rule in steps S203 and S204. That is, even when connection to an existing communication system is established, the direct access to the cryptographic key is not allowed from the communication system. Thus, it is possible to ensure the security of the cryptographic key generated inside the node 100 and the cryptographic key stored in the node 100.

First Modification

Figure 7:
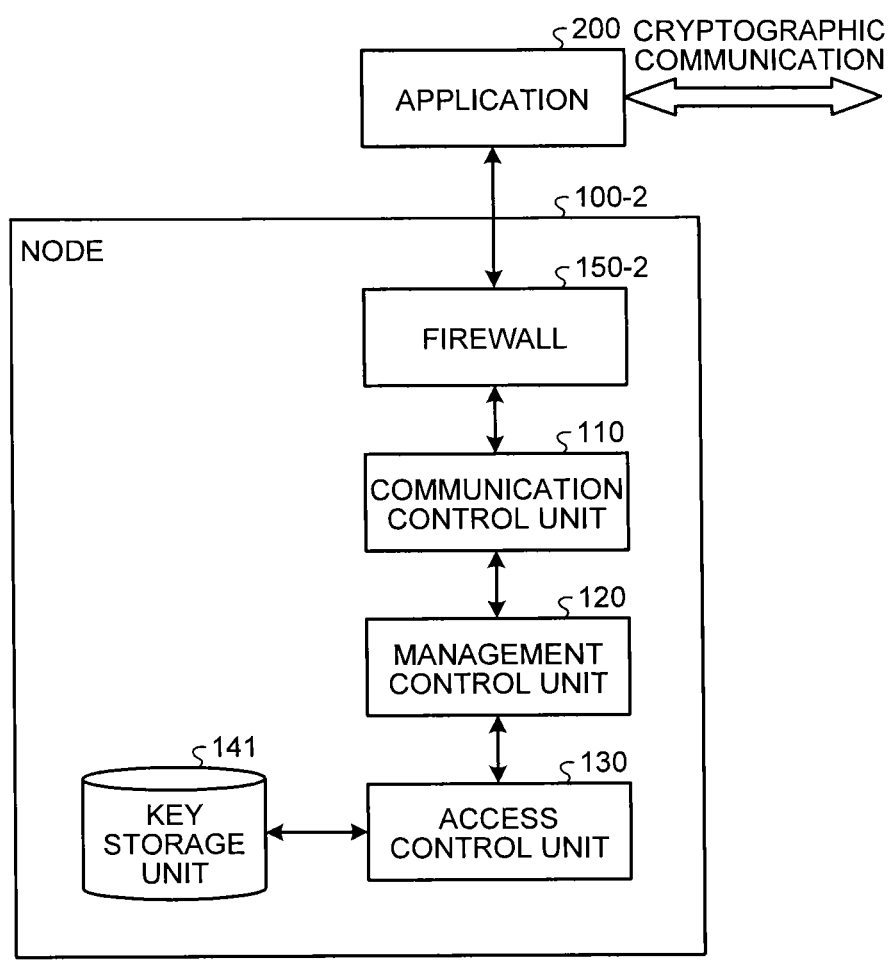
FIG. 7 is a block diagram illustrating a node according to a first modification.

A firewall function may be installed to block an originally unrelated message before a message transmitted from the outside is input to the communication control unit 110. FIG. 7 is a block diagram illustrating an example of the configuration of a node 100-2 according to a first modification. As illustrated in FIG. 7, the node 100-2 includes the communication control unit 110, the management control unit 120, the access control unit 130, the key storage unit 141, and a firewall 150-2.

The firewall 150-2 performs a firewall function of passing only a legitimate message. For example, the firewall 150-2 has a function of determining the contents of a message and passing only a message for a customer during service provision. Further, the firewall 150-2 may be configured to determine phases of transmission and reception of a message and pass only a righteous phase message. The firewall 150-2 may have a function of updating a pattern or the like of an attack message periodically and passing no message matched to the pattern. Thus, since protection against the newest attacks is realized, security is further improved.

Second Modification

In the cryptographic key generating service, it is important not to leak a cryptographic key, particularly, a cryptographic key that has been provided to a user, against attacks such as cyberattacks from the outside. Therefore, it is important to provide a function of protecting a message to be output against attacks from the outside as in a message against attacks from the outside. In particular, the cryptographic key is information that is not changed or converted during transmission and is transmitted from a key storage unit 141 to the application 200. Therefore, in the cryptographic key generating service, it is important to confirm a partner to receive the message and not to leak inside information regarding use of the cryptographic key to the outside.

Figure 8:
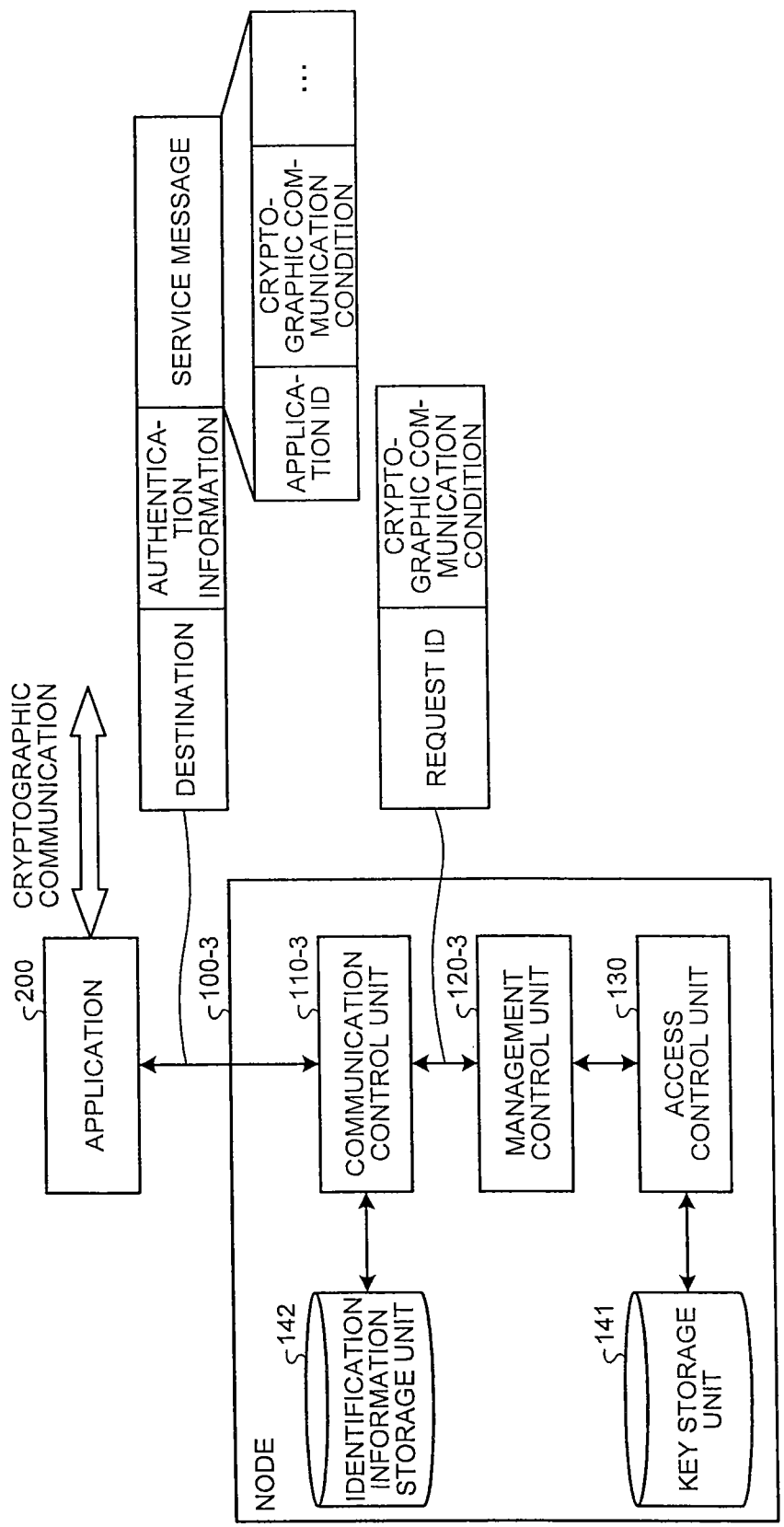
FIG. 8 is a block diagram illustrating a node according to a second modification.

In a second modification, a verification function during transmission of a message to the outside is further provided. FIG. 8 is a block diagram illustrating an example of the configuration of a node 100-3 according to the second modification. As illustrated in FIG. 8, the node 100-3 includes a communication control unit 110-3, a management control unit 120-3, an access control unit 130, a key storage unit 141, and an identification information storage unit 142.

The communication control unit 110-3 further includes, in addition to the functions of the communication control unit 110 of the first embodiment, the following functions.

The communication control unit 110-3 verifies whether a cryptographic key to be provided is attempted to be transmitted to the valid application 200 corresponding to the cryptographic key when transmitting the cryptographic key. For example, the communication control unit 110-3 checks whether a destination and a combination of the destination and the cryptographic key are correct when the cryptographic key is extracted from the internal message and is converted into a message to be transmitted to the outside. Specifically, the communication control unit 110-3 verifies whether an ID associated with the cryptographic key and an ID (application ID or the like) associated with the destination are correctly combined.

When supporting a plurality of communication channels, the communication control unit 110-3 checks whether the message to be transmitted to the outside is handed to an interface of a correct communication channel.

The communication control unit 110-3 may generate a unique ID (request ID) in the node 100-3 for each requested cryptographic key generating service and may process transmission and reception of the cryptographic key inside the node 100-3 based on the request ID. The identification information storage unit 142 stores therein identification information (application ID) for identifying the application 200 requesting the cryptographic key generating service in association with the request ID. For example, the communication control unit 110-3 acquires the request ID associated with the application ID included in the service message from the identification information storage unit 142. Then, the communication control unit 110-3 generates request information including the acquired request ID and a cryptographic communication condition included in the service message and transmits the request information to the management control unit 120-3.

The management control unit 120-3 controls management of the cryptographic key based on the request information.

With such a configuration, it becomes more difficult to obtain information regarding the cryptographic key that a specific application 200 receives from the outside. This is because, at the attacks to the node 100-3 from the outside, the cryptographic key relative to the application 200 targeted for the attacks may not be designated in advance.

For example, the access control unit 130 or the management control unit 120-3 may monitor that the same cryptographic key is output a plurality of times, the same cryptographic key is output in association with different request IDs, or the same cryptographic key is output to different communication partners. Thus, at an abnormal time, the cryptographic key can be prevented from leaking by stopping the transmission of the cryptographic key.

Figure 9:
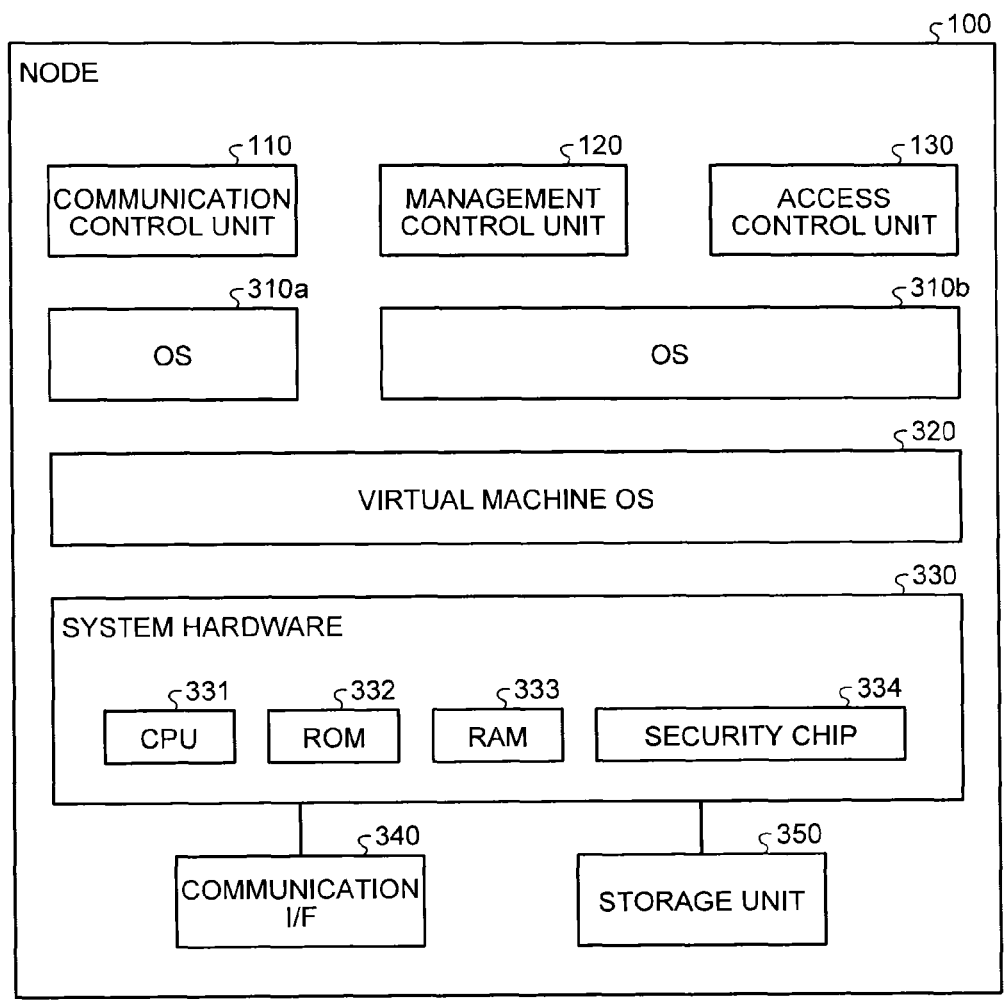
FIG. 9 is a diagram illustrating a hardware/software configuration of the node according to the first embodiment.

Next, an example of a configuration will be described when the communication control unit 110, the management control unit 120, and the access control unit 130 are realized by software. FIG. 9 is a diagram illustrating an example of hardware and software configurations of the node 100.

The node 100 includes system hardware 330, a communication I/F 340, and a storage unit 350 as the main hardware configuration. The node 100 includes a virtual machine OS (operating system) 320, an OS 310a, an OS 310b, a communication control unit 110, a management control unit 120, and an access control unit 130 as the main software configuration.

The system hardware 330 includes a CPU 331, a ROM 332, a RAM 333, and a security chip 334.

The communication I/F 340 is an interface that is connected to a network and performs communication. The storage unit 350 is a memory device such as an HDD (hard disk drive). For example, the key storage unit 141 corresponds to the storage unit 350.

The virtual machine OS 320 is a software unit that virtualizes a computer and enables a plurality of OSs to be executed in parallel. The OS 310a and the OS 310b are OSs that are executed on the virtual machine OS 320.

As illustrated in FIG. 9, the communication control unit 110, and the internal management control unit 120, the internal access control unit 130, and the like of the communication control unit 110 are executed on different OSs (the OS 310a and the OS 310b). Thus, resistance to a memory overflow attack or the like can be improved.

Each OS (the OS 310a and the OS 310b) and software (the communication control unit 110, the management control unit 120, and the access control unit 130) executed on the OS are protected by the security chip 334. Further, security may be improved by performing mutual authentication between modules (the communication control unit 110, the management control unit 120, and the access control unit 130).

As described above, according to this embodiment, the management control unit 120 and the like can be configured not to be directly accessed from the outside. When the cryptographic key is written or read, data of the cryptographic key cannot help being handled transparently together with the information (key ID) for identifying the cryptographic key. Accordingly, it is important for the management control unit 120 and the access control unit 130 not to be affected from an ill-minded person.

Third Modification

Figures 10, 11:
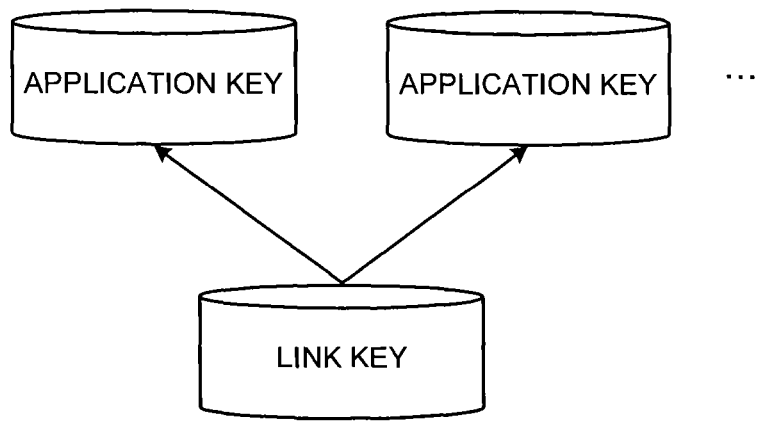
FIG. 10 is a concept diagram illustrating a link key and an application key hierarchically configured and managed.
FIG. 11 is a diagram illustrating an example of management information used to realize the hierarchical configuration.

In a third modification, an example in which a cryptographic key is managed in a hierarchical manner will be described. FIG. 10 is a concept diagram illustrating an example in which a cryptographic key is managed at two hierarchical levels of a link key and an application key. FIG. 10 schematically illustrates management in which a link key as an upper class key is associated with a plurality of application keys as lower class keys.

FIG. 11 is a diagram illustrating an example of management information used to realize the hierarchy of FIG. 10. The management information includes a key ID, a key virtual class, an upper class ID, and key information. The key information is data of the cryptographic key corresponding to the key ID.

The key virtual class indicates a hierarchy (class) to which the hierarchically configured cryptographic key belongs. In the example of FIG. 10, the key virtual class is set to one of a link class and an application class.

The upper class ID indicates a key ID of the cryptographic key of the upper class to be associated with the cryptographic key set to the key virtual class. In the example of FIG. 11, a cryptographic key with the key "ID=0002" is an application key, and the cryptographic key of the upper class is a link key with the key "ID=0001."

For example, the access control unit 130 accesses the cryptographic key stored in the key storage unit 141 based on the management information. The cryptographic key may be managed based on an attribute of the cryptographic key. The attribute refers to information indicating whether the cryptographic key is the "link key" or the "application key."

Figure 12:
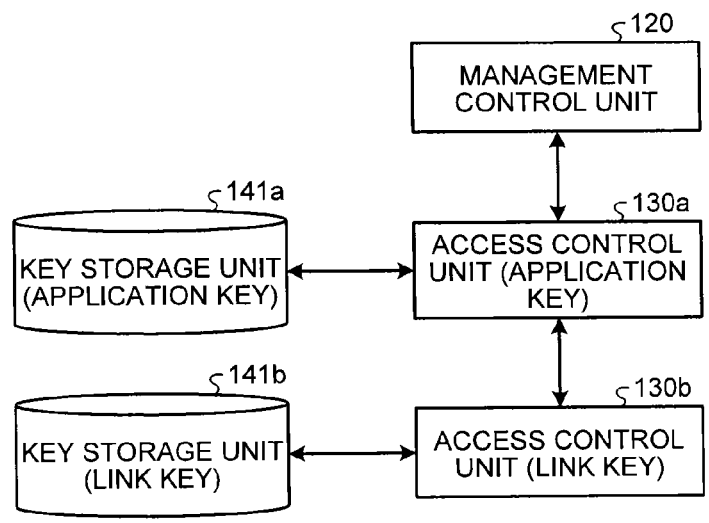
FIG. 12 is a block diagram illustrating modules of cryptographic key management of each layer.

Each management of the cryptographic key at each hierarchy may be configured as a module. FIG. 12 is a block diagram illustrating an example of the configuration of the node 100 having the above-described configuration. In FIG. 12, only a management control unit 120, access control units 130a and 130b, and key storage units 141a and 141b are illustrated and the other constituent units are not illustrated.

In the example of the configuration illustrated in FIG. 12, the node 100 includes two access control units 130a and 130b and two key storage units 141a and 141b. The key storage units 141a and 141b store therein an application key and a link key, respectively. The key storage units 141a and 141b may be configured as different storage regions of the physically same storage medium or may be configured by physically different storage media.

The access control units 130a and 130b control the accesses to the key storage units 141a and 141b, respectively.

With such a configuration, for example, the degree of isolation of cryptographic keys (a link key, an application key, and the like) other than the cryptographic key (application key or the like) to be directly provided to the application 200 from the outside can be improved. That is, for example, an access to a valuable quantum key transmitted through the QKD can be configured to be further disabled from the outside.

Further, a plurality of the management control units 120 may be provided to correspond to the hierarchies of the cryptographic keys. That is, the generation and management of the cryptographic key of each hierarchy may be also configured hierarchically. Thus, the security of a specific function of the cryptographic key generating service can be further improved.

As described above, according to the first embodiment, the cryptographic key can be securely provided by disabling attacks such as wiretapping or copy of the cryptographic key from the outside via the communication interface that provides the cryptographic key.

Second Embodiment

Depending on the configuration of a cryptographic key generating service, cryptographic keys are sometimes generated from a plurality of positions at which applications 200 require the cryptographic keys. To share the cryptographic keys, for example, a cryptographic key managing function (management control unit) sometimes has a communication channel for a communication partner other than the application 200. In this case, the communication channel may also become a route of attacks or invasions from the outside.

Figure 13:
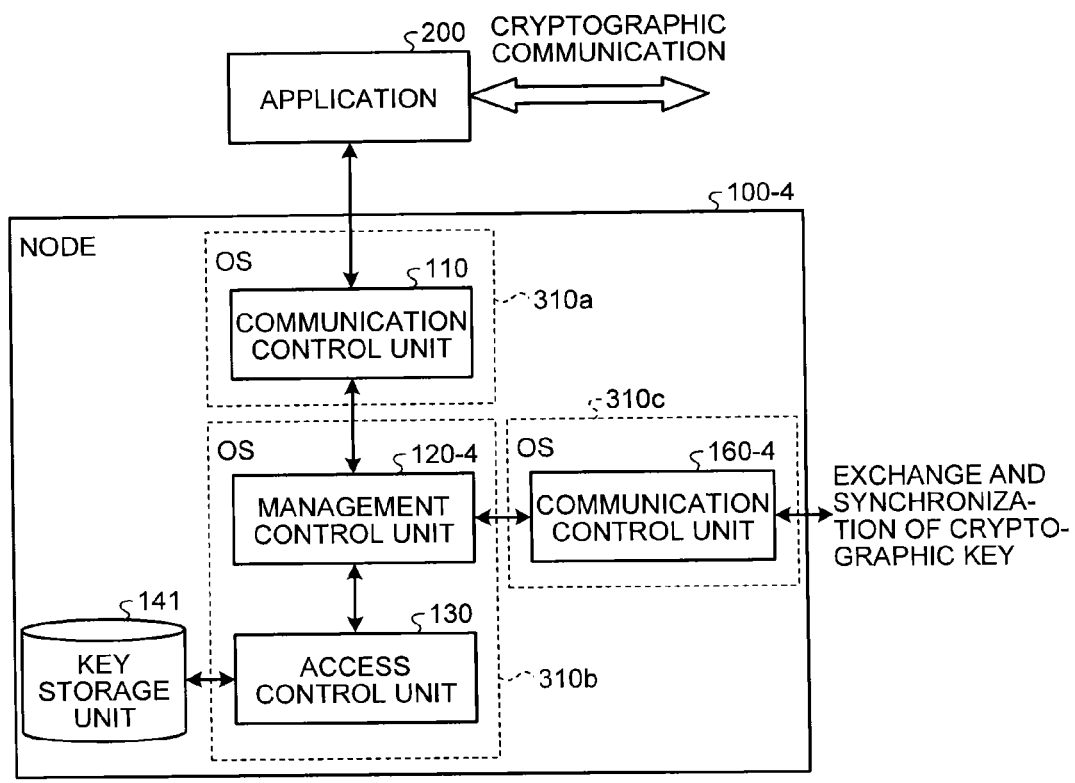
FIG. 13 is a block diagram illustrating the configuration of a node according to a second embodiment.

In a second embodiment, an example in which a plurality of communication channels (communication I/Fs) are provided will be described. FIG. 13 is a block diagram illustrating an example of the configuration of a node 100-4 according to the second embodiment. As illustrated in FIG. 13, the node 100-4 includes a communication control unit 110, a management control unit 120-4, an access control unit 130, a key storage unit 141, and a communication control unit 160-4.

The second embodiment is different from the first embodiment in that the function of the management control unit 120-4 and the communication control unit 160-4 are added. Since the other configurations and functions are same as those of the node 100 illustrated in the block diagram of FIG. 3 in the first embodiment, the same reference numerals are given and the description thereof will not be repeated.

The management control unit 120-4 communicates with the outside via not only a communication I/F (not illustrated in FIG. 13) for the application 200 but also a communication I/F (not illustrated in FIG. 13) for exchange and synchronization of a generated cryptographic key (for example, a link key).

The communication control unit 160-4 controls the communication via the communication I/F for exchange and synchronization of the cryptographic key. The communication control unit 160-4 has the same function as the communication control unit 110. Thus, the security can be improved by disabling attacks from the outside via the communication I/F for the communication partner other than the application 200.

In FIG. 13, the communication control unit 160-4 operates on an OS 310c different from the OS 310a and the OS 310b. Thus, with such a configuration, resistance to a memory overflow attack or the like can be improved.

Third Embodiment

The same consideration has to be necessary also for an operation managing function. The operation managing function is required to perform stable and sound operations of a node. To perform centralized management in the operation managing function, a communication function is provided to expand a function via a network. Accordingly, attacks to a cryptographic key via a communication channel used by the operation managing function have to be prevented.

Figure 14:
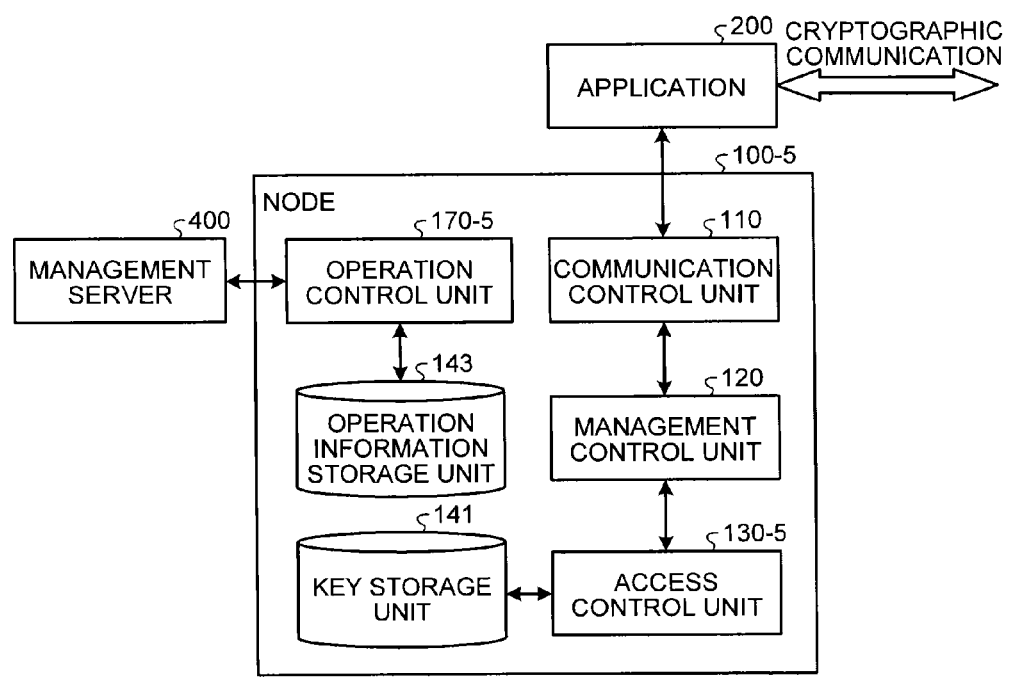
FIG. 14 is a block diagram illustrating the configuration of a node according to a third embodiment.

In a third embodiment, an example in which the operation managing function including a corresponding communication channel (communication I/F) is provided will be described. FIG. 14 is a block diagram illustrating an example of the configuration of a node 100-5 according to the third embodiment. As illustrated in FIG. 14, the node 100-5 includes a communication control unit 110, a management control unit 120, an access control unit 130-5, a key storage unit 141, an operation control unit 170-5, and an operation information storage unit 143.

The third embodiment is different from the first embodiment in that the function of the access control unit 130-5, the operation control unit 170-5, and the operation information storage unit 143 are added. Since the other configurations and functions are same as those of the node 100 illustrated in the block diagram of FIG. 3 in the first embodiment, the same reference numerals are given and the description thereof will not be repeated.

The operation information storage unit 143 stores therein various kinds of information to be used for operation management.

The operation control unit 170-5 receives a request for the operation management from a management server 400 and controls various operation managing functions in response to this request. The management server 400 is a server that remotely performs the operation managing function. The operation control unit 170-5 communicates with the management server 400 via a communication I/F (not illustrated) different from the communication I/F connected to the application 200.

The operation control unit 170-5 may have the same function as the communication control unit 110. For example, the operation control unit 170-5 analyzes a command received from the outside and generates a necessary response. The command includes a command (write command) to perform writing (registration or promotion). The operation control unit 170-5 checks whether the received command is the contents defined in advance. Thus, an abnormal access may not be made.

The access control unit 130-5 further includes a function of rejecting an access to the cryptographic key requested from the operation control unit 170-5. For example, the access control unit 130-5 is designed not to return the key information in regard to a message from the operation control unit 170-5. Thus, it is possible to suppress a danger to the leakage of the key information due to attacks to the operation control unit 170-5.

Fourth Embodiment

In a fourth embodiment, an example of the configuration of a relay node that manages exchange (synchronization) of a cryptographic key and relays the cryptographic key without receiving an access from an application 200 will be described as a derivative of a node that realizes a cryptographic key generating service. The relay node is used when there are restrictions on a communicable distance and the like in cryptographic communication in which the cryptographic key is exchanged and synchronized. Since the advantage of improving the degree of design freedom of the cryptographic communication system can be obtained with a simple node configuration, such a relay node is useful. For example, by using the relay node, long-range cryptographic communication can be realized in spite of the fact that there is the restriction on a distance. As a result, the high-speed cryptographic communication can be realized.

Figure 15:
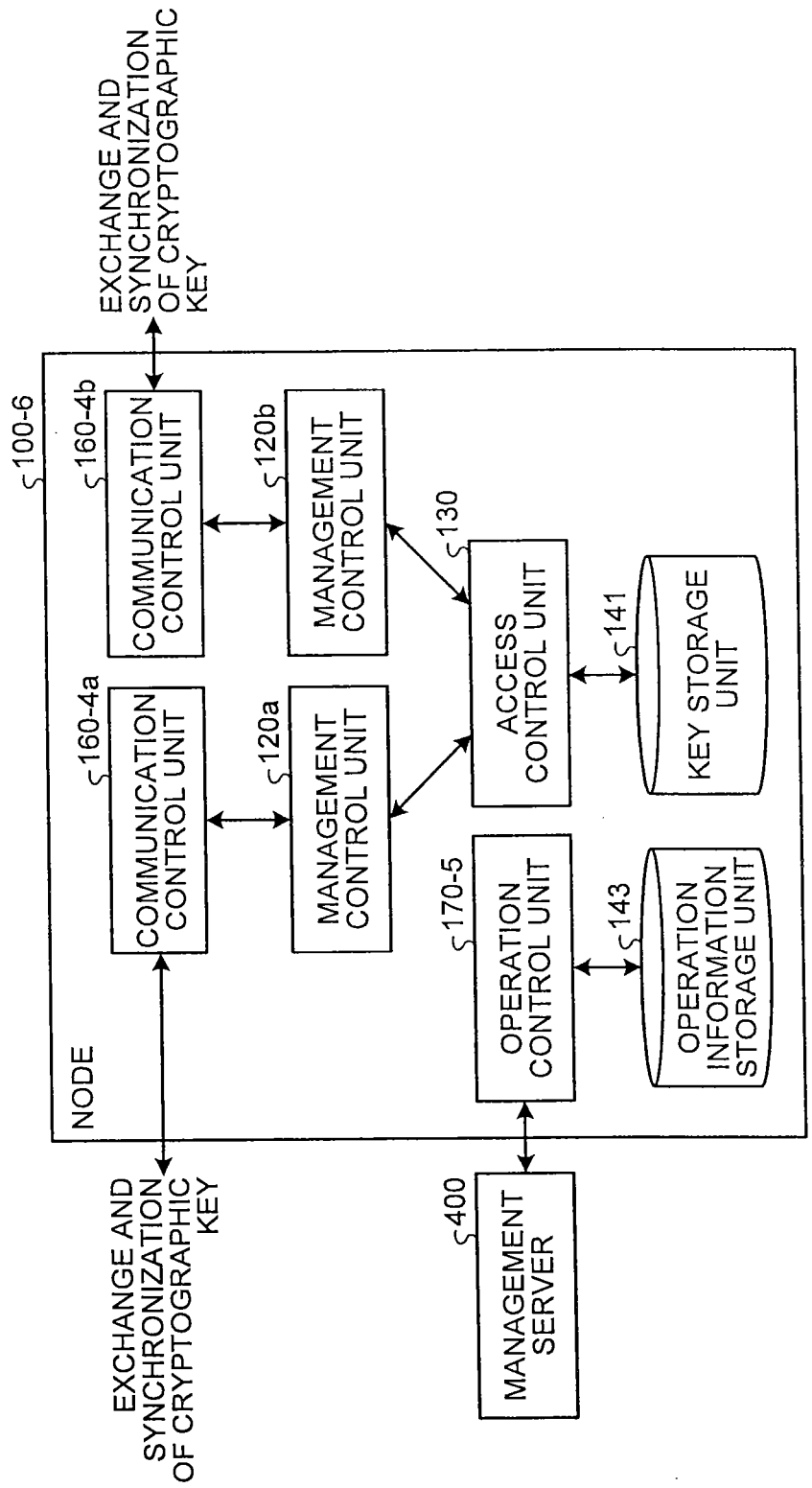
FIG. 15 is a block diagram illustrating the configuration of a node according to a fourth embodiment.

FIG. 15 is a block diagram illustrating an example of the configuration of a node 100-6 according to the fourth embodiment. As illustrated in FIG. 15, the node 100-6 includes communication control units 160-4a and 160-4b, management control units 120a and 120b, an access control unit 130, a key storage unit 141, the operation control unit 170-5, and an operation information storage unit 143.

The fourth embodiment is different from the third embodiment in that the communication control unit 110 is not provided and the plurality of communication control units 160-4a and 160-4b and the plurality of management control units 120a and 120b are provided. Since the other configurations and functions are same as those of the node 100-5 illustrated in the block diagram of FIG. 14 in the third embodiment, the same reference numerals are given and the description thereof will not be repeated.

The communication control units 160-4a and 160-4b each control communication via a communication I/F (not illustrated) connected to a communication partner with which the node 100-6 exchanges a cryptographic key. The communication control units 160-4a and 160-4b each have the same function as the communication control unit 160-4 (that is, the communication control unit 110 in FIG. 3) in FIG. 13. Thus, the security can be improved by disabling attacks from the outside.

The node 100-6 according to this embodiment is configured as a relay node that relays (transmits) the cryptographic key. Therefore, for example, the communication control unit 160-4a receives a message used to give a request for relaying the cryptographic key transmitted from an external apparatus (first apparatus) to another external apparatus (second apparatus). The communication control unit 160-4a stores the cryptographic key requested to be relayed in the key storage unit 141 via the access control unit 130.

The communication control unit 160-4a requests the communication control unit 160-4b to transmit the stored cryptographic key to the second apparatus. The communication control unit 160-4b reads the cryptographic key from the key storage unit 141 in response to the request and transmits the cryptographic key to the second apparatus.

Meanwhile, a single communication control unit 160-4 may be configured to realize the functions of the communication control unit 160-4a and the communication control unit 160-4b. Likewise, a single management control unit 120 may be configured to realize the functions of the management control units 120a and 120b.

In this embodiment, the modification of the third embodiment has been described, but one or more functions of the other embodiments and the modifications described above may be combined to realize a relay node.

The above-described cryptographic key generating service is sometimes provided additionally as a unit for improving the security to the application performing existing cryptographic communication.

A method of providing a module to be added to the existing application as a form of an application-embedded library or an externally attached filter can be considered as a method of providing the cryptographic key generating service. At this time, a mutual authentication scheme or the like in communication between the provided module and the communication control unit is required to be designed in consideration of security. This is because there is a probability that an ill-minded person may use the provided module, set up the communication control unit, and easily do the man-in-the-middle type wiretapping between the application and the communication control unit.

Basically, a unit for reliably sharing mutual authentication information between the applications may be prepared. When the existing application has a sufficiently reliable authentication system, the authentication system can be utilized. It is necessary to select a utilization method depending on the form of the provided module.

In the first to fourth embodiments, as described above, a direct access to a cryptographic key is not allowed from an external system. Therefore, the cryptographic key generating service capable of providing a highly enhanced cryptographic key can be securely used.

A program executed in the communication apparatuses described in the first to fourth embodiments is embedded in advance into a ROM or the like for supply.

The program executed in the communication apparatuses described in the first to fourth embodiments may be recorded in a computer-readable recording medium, such as a CD- ROM (compact disk read-only memory), a flexible disk (FD), a CD-R (compact click recordable), or a DVD (digital versatile disk) in an installable format file or an executable format file and may be provided as a computer-program product.

Further, the program executed in the communication apparatuses described in the first to fourth embodiments may be stored in a computer connected to a network such as the Internet and may be downloaded via the network for supply. Furthermore, the program executed in the communication apparatuses described in the first to fourth embodiments may be provided or distributed via a network such as the Internet.

The program executed in the communication apparatuses described in the first to fourth embodiments can cause a computer to function as each unit of the above-described communication apparatuses. A CPU of this computer can read and execute the program on a main storage device from a computer-readable recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
 a first interface configured to receive a message from an application;
 a second interface configured to exchange a cryptographic key;
 first key storage configured to store therein a first cryptographic key that is exchanged by using the second interface;
 second key storage configured to store therein a second cryptographic key that is exchanged by using the second interface;
 a first access controller configured to control accessing to the first cryptographic key;
 a second access controller configured to control accessing to the second cryptographic key;
 an analyzing unit configured to analyze whether the message received from the first interface includes a first access request for the first cryptographic key or the second cryptographic key; and
 a generating unit configured to, when the message includes the first access request, generate a second access request used to request an access to the first cryptographic key or the second cryptographic key requested by the first access request, the second access request having a format different from a format of the first access request, wherein
 the first access controller controls the accessing to the first cryptographic key when the generated second access request indicates an access request for the first cryptographic key, and transmits the second access request to the second access controller when the generated second access request indicates an access request for the second cryptographic key, and
 the second access controller controls the access to the second cryptographic key based on the second access request received from the first access controller.

2. The apparatus according to claim 1, wherein
 the message includes first identification information for identifying an application that uses the first cryptographic key or the second cryptographic key,
 the communication apparatus further comprises identification information storage configured to store therein the first identification information and second identification information in association with each other, and
 when the message includes the first access request, the generating unit generates the request information that is associated with the second identification information corresponding to the first identification information included in the received message.

3. The apparatus according to claim 1, wherein the first access controller, the second access controller, and at least one of the receiving unit, the analyzing unit, and the generating unit are executed on different operating systems.

4. The apparatus according to claim 1, further comprising an operation control unit configured to receive a request for operation management of the communication apparatus and controls the operation management of the communication apparatus in response to the received request, wherein
 the first access controller rejects the accessing to the first cryptographic key requested from the operation control unit, and
 the second access controller rejects the accessing to the second cryptographic key requested from the operation control unit.

5. The apparatus according to claim 1, wherein
 the first key storage stores therein the first cryptographic key transmitted from a first apparatus,
 the first interface receives the message indicating a request to relay the first cryptographic key transmitted from the first apparatus to a second apparatus,
 when the message includes the first access request, the generating unit generates the second access request of the first cryptographic key requested to be relayed in response to the first access request, and
 the first access controller reads the first cryptographic key from the first key storage according to the second access request.

6. The apparatus according to claim 1, wherein
 the second key storage stores therein the second cryptographic key transmitted from a first apparatus,
 the first interface receives the message indicating a request to relay the second cryptographic key transmitted from the first apparatus to a second apparatus,
 when the message includes the first access request, the generating unit generates the second access request of the second cryptographic key requested to be relayed in response to the first access request, and
 the second access controller reads the second cryptographic key from the second key storage according to the second access request.

7. A key managing method which is performed by a communication apparatus including key storage that stores therein a cryptographic key, the method comprising:
 receiving, by a first interface, a message from an application;
 exchanging, by a second interface, a cryptographic key;
 storing, by the first key storage, a first cryptographic key that is exchanged by using the second interface;
 storing, by second key storage, a second cryptographic key that is exchanged by using the second interface;
 controlling, by a first access controller, accessing to the first cryptographic key;

controlling, by a second access controller, accessing to the second cryptographic key;

analyzing whether the message receiving from the first interface includes a first access request for the first cryptographic key or the second cryptographic key;

generating, when the message includes the first access request, a second access request used to request an access to the first cryptographic key or the second cryptographic key requested by the first access request, the second access request having a format different from a format of the first access request;

when the generated second access request indicates an access request for the first cryptographic key, controlling, by the first access controller, the accessing to the first cryptographic key, and when the generated second access request indicates an access request for the second cryptographic key, transmitting, by the first access controller, the second access request from the first access controller to the second access controller; and controlling, by the second access controller, accessing to the second cryptographic key based on the second access request received by the second access controller from the first access controller.

* * * * *